Sept. 19, 1967   C. VAN DER LELY   3,342,025
DRUM TEDDERS
Filed June 26, 1964   5 Sheets-Sheet 5

INVENTOR.
CORNELIS VAN DER LELY
BY
Mason, Mason & Albright
Attorneys

United States Patent Office

3,342,025
Patented Sept. 19, 1967

3,342,025
DRUM TEDDERS
Cornelis van der Lely, Zug, Switzerland, assignor to Patent Concern N.V., Willemstad, Curacao, Netherlands Antilles, a limited-liability company of the Netherlands Antilles
Filed June 26, 1964, Ser. No. 378,267
Claims priority, application Netherlands, July 5, 1963, 295,025; Sept. 17, 1963, 298,021
25 Claims. (Cl. 56—372)

The invention relates to a drum tedder comprising a frame and a drum adapted to rotate in the frame about an at least substantially horizontal axis and provided with tines, which move along the ground to the front, in operation, viewed in the direction of movement of the tedder and which throw the crop over and across the drum to the rear.

According to the invention guide members are arranged above the drum near one end thereof in a position such that they convey the crop displaced by the drum from the end of the drum towards the center thereof. It is thus possible to obtain a device in which the crop displaced by the drum is guided effectively so that the crop can be deposited on a strip of land which is narrower than the working width of the drum.

The invention furthermore relates to a drum tedder comprising a frame and a drum which is journalled in the frame so as to be rotatable about an at least substantially horizontal axis, there being provided a guide member with the aid of which the crop displaced by the drum can be deposited on a strip of land the width of which is smaller than the working width of the drum tedder. In accordance with the invention the side of the guide member facing the drum is located, viewed from aside, near the path described by the free ends of the tines. In this way an efficacious construction of the guide member can be obtained, so that the crop can be displaced effectively.

According to a third aspect of the invention there is provided a drum tedder comprising a frame which is built up from two relatively hinged frame portions, each of which accommodates a drum adapted to rotate about a horizontal axis, the two drums being coupled with each other by means of a universal joint, while the horizontal pivotal shaft extending at least substantially in the direction of travel and joining the two frame portions is located in front of the universal joint between the two drums.

In this manner a simple and solid connection can be established between the two frame portions, while the device can satisfactorily match the unevennesses of the ground in spite of the large working width.

For a better understanding of the invention and to show how the same may be readily carried into effect, reference is made by way of example to the accompanying drawing, in which.

Figure 1:
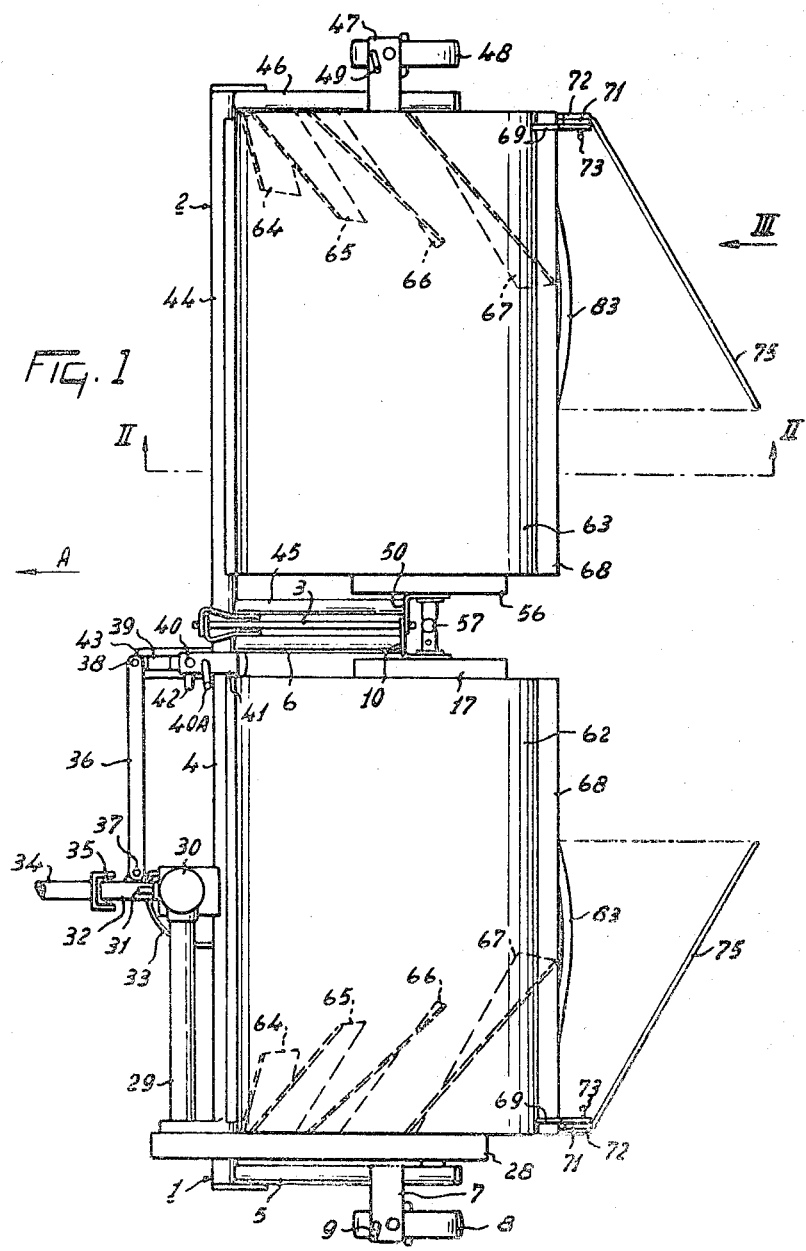
FIG. 1 is a plan view of the device according to the invention.

The frame of the drum tedder shown in FIG. 1 comprises two frame portions 1 and 2, which are hinged to each other by means of a pivotal shaft 3. The frame portion 1 comprises a frame beam 4, to the ends of which are secured frame beams 5 and 6 at right angles to the beam 4. A caster ground wheel 8 is secured to the end of the frame beam 5 remote from the frame beam 4 by means of a support 7; in known manner said ground wheel is adjustable in a direction of height with the aid of a screw spindle 9.

Figure 4:
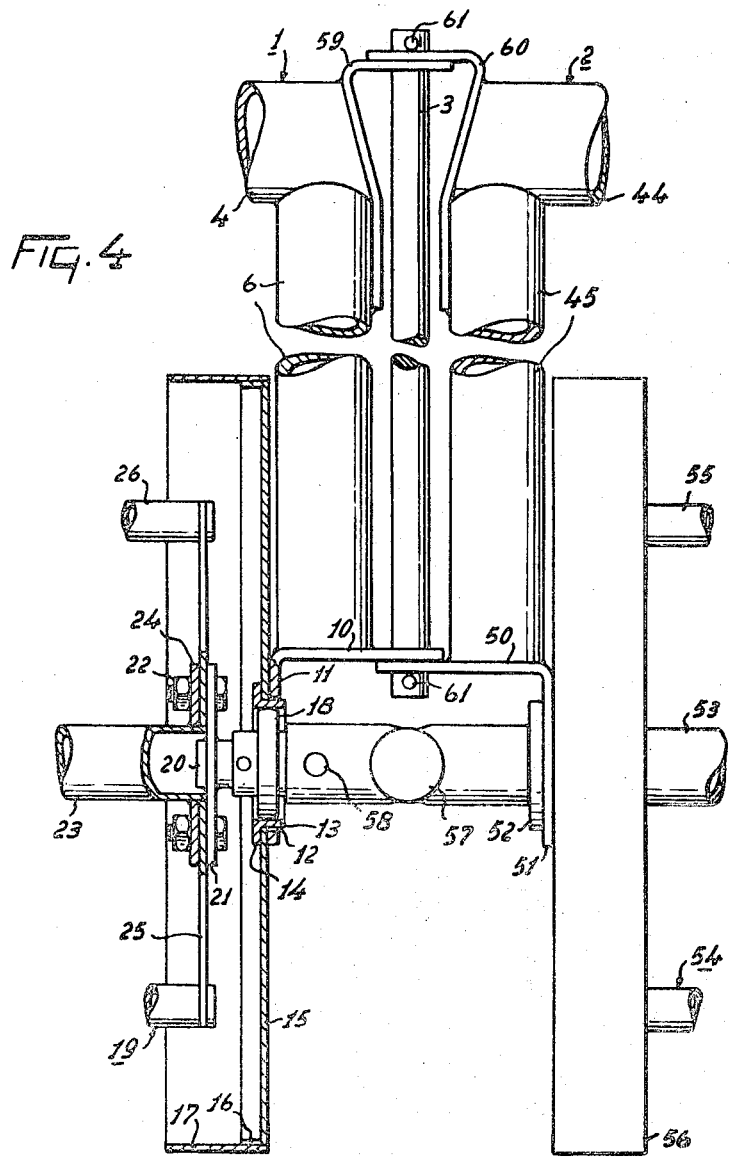
FIG. 4 shows on an enlarged scale the connection between the two portions of the frame.

A vertical plate 10 is secured to the end of the frame beam 6 remote from the frame beam 4 at right angles to the frame beam 6 (FIG. 4). A plate 11 is secured to the plate 10 so as to be at right angles thereto, said plate is provided with a hole 12, in which a sleeve 13 is accommodated which is provided with a shoulder 14. Between the plate 12 and the shoulder 14 there is arranged a plate 15, the rim 16 of which is bent over at right angles. To the rim 16 is secured a broader screening rim 17. The sleeve 13 accommodates a bearing 18 so as to be adjustable therein. With the aid of the bearing 18 a drum 19 journalled in the frame portion 1 is supported. To this end the drum comprises a stub shaft 20, which is secured to a plate 21. The plate 21 is secured with the aid of bolts 22 to a plate 24, fastened to a tube 23. The center line of the tube 23 constitutes the axis of rotation of the drum. Between the plate 21 and the plate 24 there is enclosed a supporting member 25, to which are secured four beams 26 which extend parallel to the tube 23. Resilient tines 27 are secured to said beams 26. The diameter of the cylinder described by the free ends of the tines 27 is about 100 cms. and the length of the drum is about 165 cms.

The end of the tube 23 remote from the plate 21 is journalled in a bearing secured to the beam 5 so that the tube 23 cannot be displaced in its direction of length, where it is freely rotatable about its longitudinal axis. Near the beam 5 the tube 23 is provided with a pulley which is linked by means of V-ropes arranged in a screening box 28 to a pulley fastened to the end of a shaft journalled in a cylinder 29. The shaft journalled in the cylinder 29 is coupled through a gear wheel transmission arranged in a gear box 30 with a shaft 31, one end of which projects from the gear box 30.

The frame beam 4 has furthermore secured to it an arm 32, which is adapted to turn with respect to the frame beam 4 about a vertical axis. The arm 32 thus moves along a bracket 33 secured to the frame beam 4 and the arm 32 can be secured against a turn relative to the frame by means of a pin which can be inserted into one of the holes provided in the bracket 33. A draw bar 34 is coupled with the arm 32 by means of a horizontal shaft 35, which is at right angles to the longitudinal direction of the draw bar.

One end of a coupling rod 36 is hinged by means of a vertical pin 37 to the arm 32. The other end of the coupling rod 36 is hinged by means of a pin 38 to an arm 39, which is coupled with a vertical shaft 40, which is rotatably journalled in a support 41, secured to the frame. The shaft 40 is coupled by means of an arm 42 with a horizontal shaft, about which a ground wheel 43 is freely rotatable. The ground wheel 43 can be adjusted in known manner in a direction of height with the aid of a screw spindle 40A.

The two frame portions 1 and 2 are at least substantially symmetrical to the pivotal shaft 3. The frame portion 2 comprises a frame beam 44, to the ends of which are secured frame beams 45 and 46, extending at right angles to the frame beam 44. A caster ground wheel 48 is secured to the end of the frame beam 46 with the aid of a support 47; with the aid of a screw spindle 49 said ground wheel is adjustable in a direction of height in known manner. A plate 50 is secured to the end of the frame beam 45 remote from the frame beam 44 (FIG. 4) so as to extend at right angles to the frame beam 45. At right angles to the plate 50 there is secured thereto a plate 51, in which a sleeve 52 corresponding with the sleeve 13 is arranged, which serves to support a stub shaft secured to a tube 53 and supported like the stub shaft 20 secured to the tube 23. The tube 53 forms part of a drum 54, journalled in the frame portion 2 and provided with beams 55, to which resilient tines 27 are secured. The drum 54 is constructed at least substantially in the same manner as the drum 19 journalled in the frame portion 1. The ends of the tubes 55 with the supports holding said tubes are surrounded by a screening rim 56 like the screening rim 17.

The drums 19 and 54 are coupled with each other by means of a universal joint 57, which is secured by means of a pin 58 to the stub shaft 20, while the part of the universal joint which is slipped on the stub shaft of the drum 54 of the frame portion 2, is freely slidable relative to said stub shaft.

The horizontal pivotal shaft 3, which is at right angles to the axis of rotation of the drum, is journalled at one end in holes provided in the plates 10 and 50, whereas the other end is journalled in holes provided in supports 59 and 60, which are secured to the ends of the frame beams 4 and 44. The shaft 3 is secured against displacement in its longitudinal direction by means of pins 61, which are taken through holes in the shaft 3.

On the upper side the two drums are surrounded by hoods 62 and 63 respectively. On the front side of the drum, the end of the hood is located, in a side view, approximately at the level of the axis of rotation of the drum, from where the hoods extend substantially concentrically to the axis of rotation of the drum, while the line of connection between the rotational axis of the drum and the end of the hood located behind the drum is at an angle of about 40° to the vertical.

Beneath each screening hood 62 or 63 there is provided a number of guide members formed by plates, which extend from the side of the device towards the center. Since the arrangement of the plates is the same for the two hoods, this will be described more fully only for one hood; corresponding parts on the other side of the device beneath the other hood will be designated by the same reference numerals. From the figure it will be apparent that four plates 64, 65, 66 and 67 are arranged beneath each hood. In a plan view the plates extend from the side of the device obliquely to the rear and to the center, while they are at an angle of about 45° to the axis of rotation of the drum. The length of the plates is such that the shorter plate, which is located near the front side of the device, viewed from above, extends over about one fifth of the length of the drum, whereas the hindmost, longer plate extends over about half the length of the drum or about one fourth of the working widths of the device.

The plates are not accurately normal to the wall of the hood, but are at an acute angle thereto so that the lower sides of the plates are located nearer the center of the drum than the sides of the plates fastened to the hood.

Figure 2:
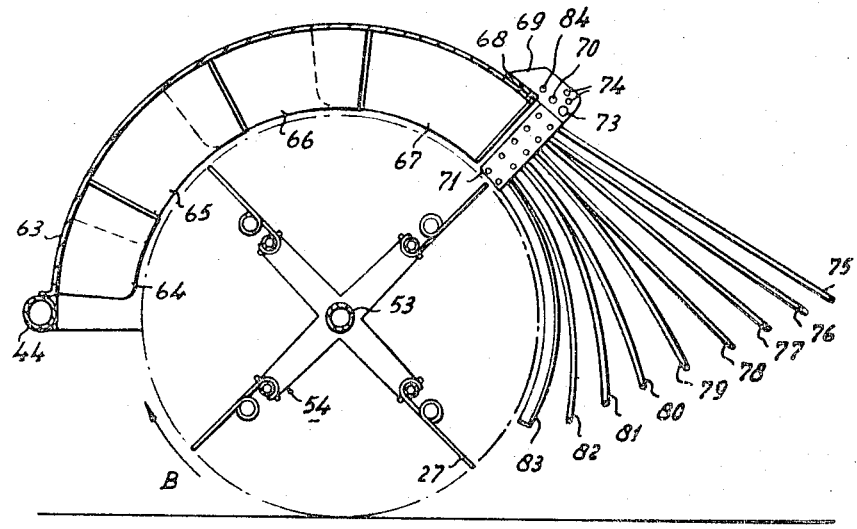
FIG. 2 is a sectional view taken on the line II—II of FIG. 1.

From FIG. 2 it will be apparent that the sides of the plates remote from the hood are shaped in a form such that, in a side view, they are concentrical to the axis of rotation of the drum. The plate 64 extends, in a side view, from the lower side of the hood, that is to say approximately from a horizontal plane going through the axis of rotation of the drum over an angle of about 30° around the axis of rotation. The plate 65 extends over an angle of about 40° around the axis of rotation, while the plate 65 overlaps the plate 64 over an angle of about 10°. The plate 66 which also overlaps the plate 65 over an angle of about 10°, extends over a circumferential angle of about 45°. The plate 67, which overlaps the plate 66 over an angle of also 10° approximately, viewed from aside, extends over a circumferential angle of about 45° up to the rear side of the hood. Both viewed from above and from aside the plates 64 to 67 overlap each other.

A strip 68 is provided along the read side of each hood for stiffening purposes. Supports in the form of vertical plates 69 are secured to said strip at the remote ends of the two hoods. With the aid of a pin 70, extending parallel to the axis of rotation of the drum, two interconnected plates 71 and 72 are hinged to the plate 69. The plates 71 and 72 can be locked against rotation about the pin 70 by means of a locking pin 73, which can be taken through one of the holes 74 provided in the plate 69 and through the holes provided in the plates 71 and 72. Between the plates 71 and 72 there are clamped tight the ends of a number of spring steel bars 75 to 82, as well as the end of an angular-section iron 83.

Figure 3:
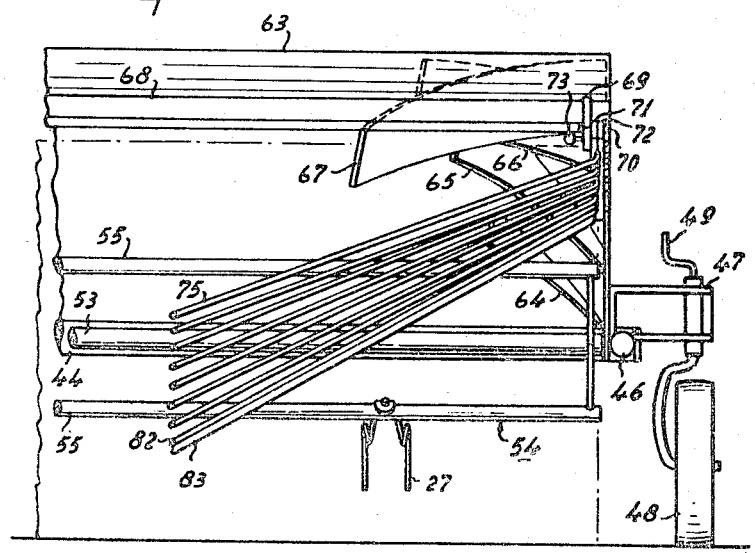
FIG. 3 is an elevation in the direction of the arrow III in FIG. 1.

From FIG. 2 it will be seen that the angular-section iron extends, viewed from aside, along the circle traced by the free ends of the tines. The angular-section iron 83 is arranged so that one of its limbs extends, in a side views, at least substantially parallel to said circle and from the other limb in a direction towards the bars 75 to 82. The other limb of the angular-section iron is located between the limb extending parallel to the circle described by the tine ends and the circle concerned. In a rear view the angular-section iron extends from its fastening points on the plates obliquely downwards towards the center of the device. In the position shown in the FIGURE 3, the angle between the angular-section iron and the horizontal is approximately equal to 30°. The topmost bar 75 extends, viewed from aside, from its junction to the plates 71 and 72 obliquely downwards and rearwards. The bar is substantially straight throughout its length and is at an angle to the horizontal which is about 40° in the position shown in the figure. In a plan view of the bar 75 is at an angle of about 30° to the axis of rotation of the drum. In a rear view the bar 75 extends also from its junction to the plates 71 and 72 obliquely downwards and towards the center of the device, while the angle between said bar and the horizontal is about 20°. The bars 76 to 82 are disposed between the angular-section iron 83 and the bar 75 and are shaped in a form such that the bars are spaced apart from each other by equal distances.

The device described above operates as follows. With the aid of the draw bar 34 the device can be attached to a tractor or to a similar prime mover and be moved in the direction of the arrow A. The shaft 31 can be connected by means of an intermediate shaft with the power take-off shaft of the tractor so that the two drums can be caused to rotate by the power take-off shaft of the tractor. The two drums are preferably driven so that they rotate in the direction of the arrow B.

The crop is caught by the tines of the drum and guided along the lower sides of the two screening hoods over and across the drums to the rear. The plates 64 to 67 arranged above the drums impart to the crop a movement directed for the major part towards the center of the device. The crop emerging from beneath the two hoods, which is moved already towards the ground by the shape of the hoods, then comes into contact with the guide members formed by the bars 75 to 82 and the angular-section iron 83. The crop already guided slightly towards the center of the device by the plates 64 to 67, glides along the guide member formed by the bars 75 to 83 towards the center of the device so that all the crop displaced by the drum is deposited centrally behind the drum tedder in one swath. The angular-section irons 83, which form part of the guide members on the rear side of the device, also serve as scrapers extending along the circumferences of the drums, so that the crop displaced by the drums can be conducted away effectively along the guide system. It is in this case particularly advantageous that the scraper comprises a plate extending more or less at right angles to the circumscribed circle of the drum and formed by one limb of an angular-section iron so that an effective guide for the crop is obtained. By means of this device two swaths can be delivered in one large swath during one travel.

Since the two frame portions of the device are pivotally connected with each other, the drum is capable, in spite of its great length, of following effectively the unevennesses of the ground.

Owing to the disposition of the pivotal shaft 3 between the two frame beams 6 and 45, a simple, compact and rugged connection between the two frame portions can be established, while the pivotal shaft is at the same time well screened. Since the center line of the pivotal shaft intersects the center of the universal joint, the two portions of the device can readily turn relative to each other.

When the draw bar 34 is turned about the vertical shaft, the position of the steering ground wheel 43 is at the same time varied, so that the device can be arranged obliquely to the direction of travel. When the draw bar 34 is turned to an extent such that it extends at least substantially parallel to the axes of rotation of the drums, the device occupies a position suitable for transport purposes.

By a turn around the pins 70 the guide members located behind the drums can be displaced in accordance with the variable operational conditions. The guide members can be locked in a position in which they are located above the hoods 62 and 63, so that the crop does not come into contact with the guide members. To this end the plates 69 are provided with further holes 84. Also for transport purposes it is advantageous to arrange the guide members above the hoods, since in this case the width of the device is comparatively small.

Figure 5:
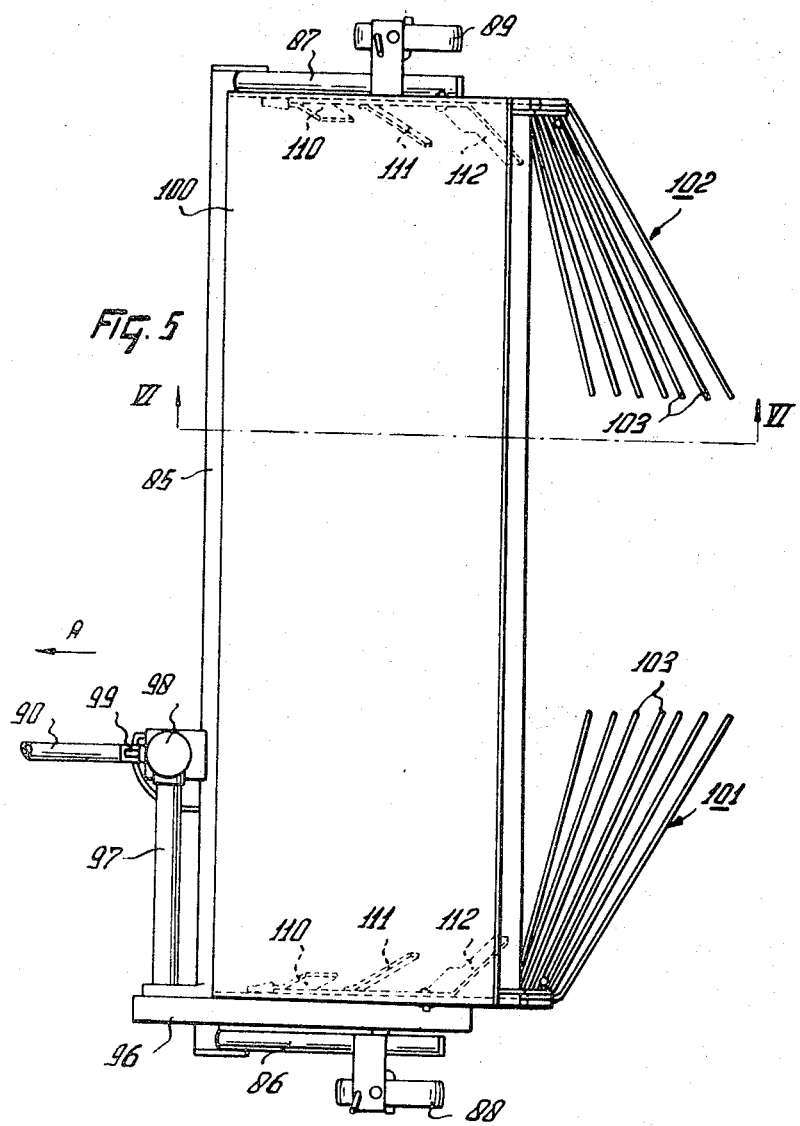
FIG. 5 is a plan view of a drum tedder according to the invention.

The frame of the drum tedder shown in FIG. 5 comprises a horizontal frame beam 85, to the ends of which frame beams 86 and 87 are secured so as to be at right angles to the beam 85. The frame beams 86 and 87 are provided with ground wheels 88 and 89, supporting the device.

Figure 6:
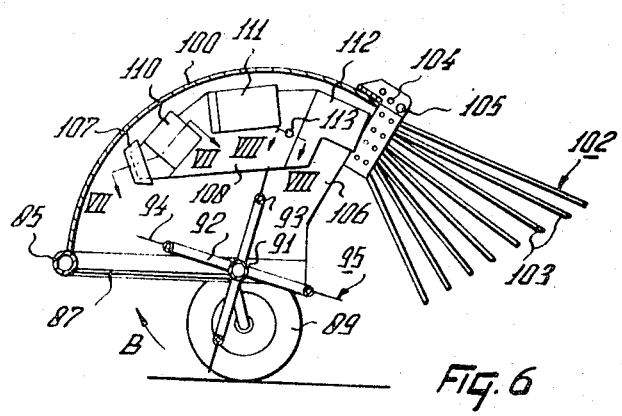
FIG. 6 is a sectional view taken on the line VI—VI in FIG. 5.
Figure 7:
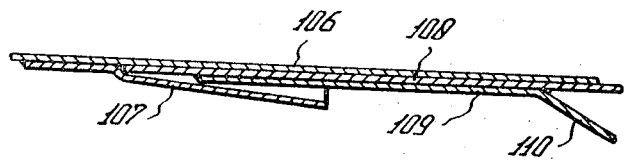
FIG. 7 is a sectional view taken on the line VII—VII in FIG. 6.
Figure 8:
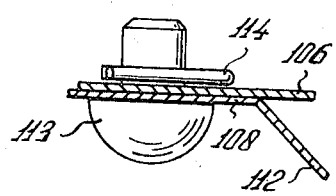
FIG. 8 is a sectional view taken on the line VIII—VIII in FIG. 6.

The frame beam 85 has furthermore secured to it a draw bar 90, which is adapted to turn about a vertical axis with respect to the frame beam and to be fixed in different positions. The frame beams 86 and 87 are provided with bearings in which a shaft 91 (FIG. 6), extending parallel to the frame beam 85, is journalled. The shaft 91 is provided with radial spokes 92, which connect beams 93 extending parallel to the shaft 91 with the shaft 91. The beams 93 are provided with resilient tines 94. The shaft 91 together with the spokes 92, the beams 93 and the tines 94, constitutes a drum 95.

At one end the shaft 91 is provided with a pulley, which is housed in a screening box 96, which accommodates a second pulley, which is secured to the end of a shaft housed in a screening box 97. The two pulleys are linked to each other with the aid of V-ropes. The end of the shaft accommodated in the screening box, i.e. the end remote from the screening box 96, is housed in a gear box 98, fastened to the frame beam 85 and is coupled through a gear wheel transmission housed in said gear box with a shaft 99, one end of which projects from the gear box.

The frame is furthermore provided with a screening hood 100 located above the drum. On the rear side, near the two ends, the screening hood is provided with guide members 101 and 102, which comprise a plurality of spring steel bars 103. Said guide members are adapted to turn with respect to the screening hood about shafts 104, extending parallel to the axis of rotation of the drum, while with the aid of locking pins 105 they can be fixed in different positions.

To each side wall 106 of the screening hood 100 there is secured a plate 107. The front side of a plate 107 and the two sides of the plate 107 engage the side wall 106 and the further part of the plate 107 is slightly bent away from the plate 106 so that between the plates 106 and 107 there is left an opening which tapers viewed from the rear side of the device. The ends of plates 108 and 109 are held between the two plates 106 and 107. The plate 109 is welded to the plate 108 and is integral with a plate 110, which, in a plan view, is bent over towards the center of the drum with respect to the plate 109. A second plate 111, which is located at a given distance behind the plate 110, is connected on one side with the plate 108 and is bent over, with respect to the portion secured to the plate 108, also towards the center of the drum. The plate 108 is integral with a plate 112, joining the former and being bent over, with respect to the plate 108, in a plan view towards the center of the drum.

Through the plate 108 and through the plate forming the side wall 106 there is taken a pin 113, through which, on the outer side of the drum, the limb of a resilient clamp 114 is taken.

The device described above operates as follows.

The device can be attached with the aid of the draw bar 90 to a tractor or a similar vehicle and be moved in the direction of the arrow A. By coupling the power take-off shaft of the prime mover of the device with the aid of an intermediate shaft with the shaft 99, the drum can be driven in the direction of the arrow B. The crop is carried along by the tines of the drum and thrown to the rear over and across the drum along the bottom side of the hood. At least part of the crop comes into contact with the plate 110, 111 and 112, forming guide members, which plates impart to the crop a movement towards the center of the drum. At least a part of the crop comes further into contact with the guide members 101 and 102, formed by the bars 103 which guide the crop so that the crop displaced by the drum is delivered in one swath, the width of which is smaller than the working width of the drum.

After the clamp 114 and the pin 113 have been removed, the plates 110, 111 and 112 which are integral with each other, can be disengaged readily so that they they no longer affect the displacement of the crop. If desired, also the guide members 101 and 102 can be tilted upwards, so that the crop can no longer come into contact with said guide members. Then the crop is spread by the drum normally throughout the width of the drum.

The plates 110 to 112 can be simply arranged in place, since only the end of the plate 108 need be slipped in between the plates 107 and 106, after which the pin 113 can be inserted. By shaping the end of the plate in a form corresponding with the shape of the opening between the plates 106 and 107, the plates 110 to 112 will arrive automatically in their correct positions, in which they are rigidly secured. The plate 107 and the pin 113 thus form so to say a quick release by means of which the guide members can be quickly and simply arranged in place and removed.

Since the side of the plate 107 lying foremost viewed in the direction of rotation of the drum engages the plate 106, no crop will stick to the plate 107.

What we claim is:

1. A drum tedder comprising a frame and a tined drum journalled in said frame, said drum being rotatable about a substantially horizontal axis for displacing and throwing crop over and across said drum to the rear as the tedder moves over the ground, a screening hood supported on said frame above said drum, guide means positioned within said hood to extend over, above and adjacent at least one end of said drum for guiding displaced crop away from said one end towards the center of said drum, said guide means comprising elements which extend obliquely to the rear, the extremities of said elements overlapping one another from the front to the rear towards the center of said drum.

2. The invention of claim 1 wherein the guide elements are composed of canted plates.

3. The invention of claim 1 wherein the guide elements are a plurality of overlapping plates that are positioned in a side of said hood.

4. The invention of claim 3 wherein the plates have different lengths and extend obliquely at different angles to the rear and towards the center of the drum.

5. The invention of claim 4 wherein the plate lying foremost viewed in the direction of rotation of the drum, measured in a direction parallel to the axis of rotation of the drum, has a length which is approximately equal to one-tenth of the working width of the drum tedder.

6. The invention of claim 4 wherein the plate lying hindmost viewed in the direction of rotation of the drum, measured in a direction parallel to the axis of rotation of the drum, has a length which is approximately equal to one-fourth of the working width of the drum tedder.

7. The invention of claim 4 wherein the plates, viewed from above, are at an angle of about 45° to a vertical plane going through the axis of rotation of the drum.

8. The invention of claim 4 wherein the guide elements are a plurality of overlapping plates, said plates being fastened to the side of said hood by quick release means for disengagement.

9. The invention of claim 8 wherein said plates are connected to each other.

10. The invention of claim 9 wherein said plates are bent over and the bent over portions form the guide means.

11. The invention of claim 1 wherein the guide elements are a plurality of overlapping plates, said plates having deflecting surfaces that extend partly across said tined drum.

12. The invention of claim 1 wherein at least one guide member is provided adjacent the rear of said drum and said guide elements for depositing said crop on the ground in a swath.

13. The invention of claim 12 wherein said guide member includes an angle iron that extends across and in the general direction of the axis of rotation of said tined drum.

14. The invention of claim 12 wherein said guide member includes an angle iron and a plurality of resilient bars positioned above said angle iron.

15. The invention of claim 14 wherein said angle iron and said bars extend downwardly across said tined drum at different angles.

16. The invention of claim 15 wherein the guide member includes retaining means for positioning said member in a plurality of settings relative to said tined drum.

17. A drum tedder comprising a frame having two side-by-side pivotally interconnected frame portions, each of said frame portions having a tined drum intercoupled by a universal joint, said frame portions being joined by a substantially horizontal pivot shaft that extends in the approximate direction of travel ahead of said universal joint, one of said frame portions being supported by two wheels and the other of said frame portions being supported by a single wheel.

18. The invention of claim 17 wherein the center line of the shaft intersects the center of the universal joint.

19. The invention of claim 17 wherein the frame includes beams for supporting the drums and the shaft is located between and substantially parallel to two of said beams.

20. The invention of claim 19 wherein supports are carried by two of said beams and the shaft is journalled in said supports.

21. The invention of claim 17 wherein one of the ground wheels coupled with one frame portion is located near the pivotal shaft on the front side of the tedder.

22. The invention of claim 21 wherein the tedder includes a drawbar and the ground wheel located near the pivotal shaft is mounted on said bar and is adapted to turn about a vertical axis with respect to the frame.

23. The invention of claim 22 wherein the drawbar can be locked against rotation in different positions about a vertical axis.

24. The invention of claim 22 wherein the drawbar is coupled with the frame and is pivotable about a horizontal axis extending at least approximately at right angles to the longitudinal direction of the drawbar.

25. A drum tedder comprising a frame and a tined drum journalled in said frame, said drum being rotatable about a substantially horizontal axis for displacing and throwing crop over and across said drum to the rear as the tedder moves over the ground, a screening hood supported on said frame above said drum, guide means comprising guide elements positioned within said hood to extend over, above and adjacent one end of said drum, said elements extending obliquely to the rear, the extremities of said elements overlapping one another from the front to the rear towards the center of said drum, said elements having deflecting surfaces facing said drum, said deflecting surfaces being located immediate the tined drum whereby the crop displaced by said drum is deposited on a strip narrower than the working width of said tedder.

References Cited

UNITED STATES PATENTS

| | | | |
|---|---|---|---|
| 1,170,616 | 2/1916 | Dintaman | 56—189 X |
| 2,377,380 | 6/1945 | Sawtelle et al. | 56—7 |
| 2,517,184 | 8/1950 | Elliot et al. | |
| 3,143,846 | 8/1964 | Savage | 56—366 |
| 3,173,238 | 3/1965 | Smith | 56—372 |

FOREIGN PATENTS 825,631   12/1959   Great Britain.

ABRAHAM G. STONE, *Primary Examiner.*

P. A. RAZZANO, *Assistant Examiner.*